United States Patent [19]

Edmondson

[11] Patent Number: 5,484,534
[45] Date of Patent: Jan. 16, 1996

[54] ENERGY CONSERVING METHOD OF WATER TREATMENT

[76] Inventor: Jerry M. Edmondson, 510 Canal St., Newport Beach, Calif. 92663

[21] Appl. No.: 273,005

[22] Filed: Jul. 8, 1994

[51] Int. Cl.⁶ .............................. B01D 17/035; C02F 1/24; C02F 9/00
[52] U.S. Cl. .......................... 210/703; 210/712; 210/744; 210/806; 210/805; 210/804; 210/195.1; 210/197; 210/202; 210/221.2; 210/294; 210/320
[58] Field of Search ...................... 210/703, 712, 210/718, 744, 806, 805, 801, 804, 202, 221.1, 221.2, 294, 320, 195.1, 197, 199, 124, 188

[56] References Cited

U.S. PATENT DOCUMENTS

| | | |
|---|---|---|
| 2,766,203 | 10/1956 | Brown . |
| 4,049,553 | 9/1977 | Stebbins . |
| 4,094,783 | 6/1978 | Jackson . |
| 4,564,457 | 1/1986 | Cairo . |
| 4,782,789 | 11/1988 | Canzoneri . |
| 4,800,025 | 1/1989 | Bibaeff . |
| 4,824,579 | 4/1989 | George . |
| 4,986,903 | 1/1991 | Canzoneri . |
| 5,011,597 | 4/1991 | Canzoneri . |
| 5,080,780 | 1/1992 | Canzoneri . |
| 5,080,802 | 1/1992 | Cairo . |
| 5,173,184 | 12/1992 | Krieger . |

*Primary Examiner*—Thomas M. Lithgow

[57] ABSTRACT

An energy conserving method and apparatus for using induced gas flotation to separate finely dispersed oil and solids from water and doing so in such a manner as to minimize the power consumption, reduce the amount of water carried with the oil and solids skimmings and eliminate complex mechanisms that would require a high degree of maintenance.

Initial flotation gas is induced through a high velocity venturi using the inlet flow to supply the kinetic energy. Secondary flotation is supplied by inducing the vapor through a high velocity venturi utilizing recycled water to provide the kinetic energy. A single pump, of relatively low horse power, circulates the recycled water.

The oil and solids skimmed from the surface of the water are transferred to an integral compartment for dewatering. The water is returned to the process stream by the single recycle pump.

3 Claims, 1 Drawing Sheet

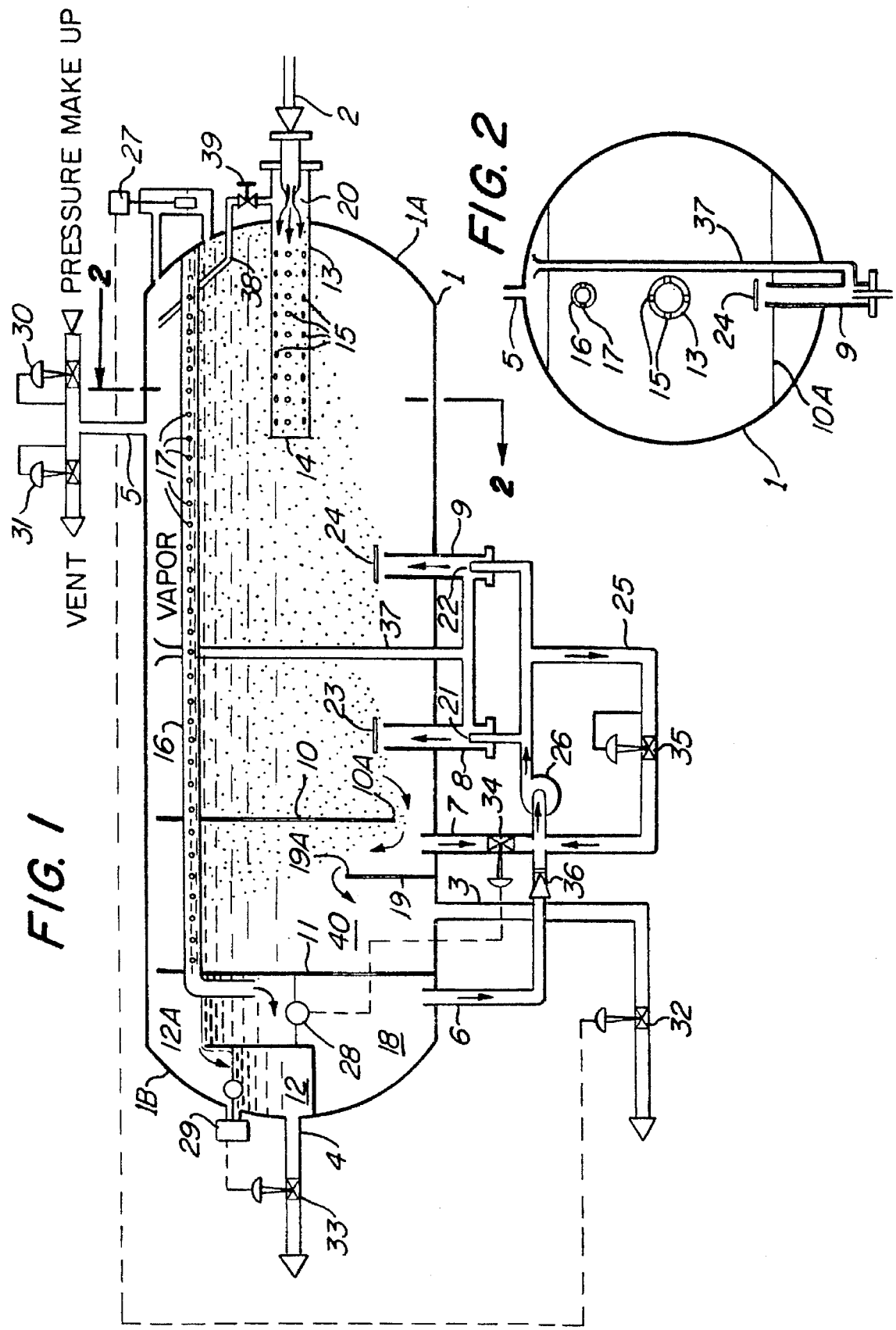

ENERGY CONSERVING METHOD OF WATER TREATMENT

BACKGROUND

Field of Invention

This invention relates to the removal of finely dispersed oil and solids from water using bubbles of gas to float the oil and solids to the surface of the water where they can then be skimmed off.

The principal of using gas bubbles to remove oil and solids from water is well known and is implemented in many ways with devices utilizing dissolved gas flotation and induced gas flotation.

Some major deficiencies in all types of flotation devices can be; high energy consumption, too much water carry over with the skimmings of oil and solids and high maintenance cost. On dissolved gas flotation systems the energy is used in operating the high horsepower pumps that are necessary to elevate the water pressure to the 3–4 atmospheres of pressure necessary to dissolve the gas into the water and electrical energy is used by the motors turning the wiper arms that skim the water surface. Both of these mechanisms require considerable maintenance.

Most of the induced gas flotation machines utilize high speed impellers to draw gas into contact with the water, there are usually four or five 5 HP. to 30 HP. motors used on each unit; furthermore, on most induced gas flotation machines there are incorporated motor driven, continuous rotation, skimming paddles.

Inherent to the operation of both the aforementioned type of flotation devices is the constant overflow of 5% to 15% of the processed water volume with the skimmings to disposal, this water must then be collected in tanks or sumps and pumped with pumps, consuming additional energy, back to the process stream. The mechanical complexity and high maintenance requirement of all of the above is apparent.

OBJECTIVES AND ADVANTAGES

It is the objective of my invention to eliminate or mitigate all of the above described deficiencies. Utilizing a venturi induced gas contact, my invention will require much less horsepower, only one 7.5 to 30 HP. motor. My invention does not require motor driven wipers and my invention, employing an integral skimmings dewatering system, delivers virtually waterless skimmings from the process. With only one pump and very few mechanized components included on my invention there will be much less maintenance requirement. A unique means for controlling the vapor induction rate and a unique means for returning the water separated from the skimmings back to the process is included on my invention.

BRIEF DESCRIPTION OF THE DRAWING

FIG. 1 is a schematic view of the invention illustrating all of the essential elements thereof.

FIG. 2 is for reference only to illustrate the vessel is of a cylindrical shape.

DESCRIPTION OF THE PREFERRED EMBODIMENT

Referring to FIG. 1 there is shown a schematic side view of an elongated horizontal vessel 1 having an inlet end 1A and an outlet end 1B. There is a water inlet 2, a water outlet 3, a skimmings outlet 4, a vapor conduit 5, a skimmings water return line 6, a recycled water outlet 7, and two recycled water inlets 8 and 9. Typically the vessel 1 would be constructed from steel and all of the openings would be pipe nozzles attached by welding. The vessel is divided into three compartments by transverse partitions 10 and 11. The outlet end of the vessel contains a skimming box 12 open on the top attached to the inner wall surface of the outlet end of the vessel. Attached to the vessel inlet end, there is an elongated cylindrical conduit 13 extending inwardly into the vessel, said conduit having a cap 14 on the end opposite the inlet end and contains a multitude of openings 15 through which the water may enter the vessel interior. In the upper portion of the vessel is an elongated horizontal conduit 16 extending from the inlet end of the vessel penetrating partition 10 and extending through partition 11. This conduit contains a multitude of openings that permit oil and suspended solids to be skimmed from the surface of the water through the openings into the conduit and delivered to a dewatering compartment 18 that is segregated at the outlet end of the vessel by partition 11. Other essential components are; a semi circular baffle 19 positioned transverse to the flow located between partitions 10 and 11 extending from the bottom surface of the vessel upward to where the top edge 19A is above the bottom edge 10A of partition 10, a venturi inductor 20 located at the water inlet, venturi inductors 21 and 22 located at the recycled water inlets, diffuser discs 23 and 24 located above the return water inlets, a recycle water bypass line 25, a recycle water pump 26, a level sensor 27, a level sensor 28, a level sensor 29, a vapor makeup valve 30, a vapor vent valve 31, a water discharge valve 32, a skimmings discharge value 33, a recycled water control valve 34, a recycle bypass control valve 35, a check valve 36, a recycled vapor return line 37, a recycled vapor return line 38 and a vapor return rate control valve 39.

DESCRIPTION OF OPERATION

Water containing finely dispersed oil particles and solids particles enters the vessel at the water inlet 2. The velocity of the water flow is increased sufficiently through the venturi inductor 20 to draw vapor through the vapor line 38 into contact with the water; the vapor rate can be regulated by opening or closing the recycle vapor return rate valve 39, the violet action created by the high velocity venturi will cause the vapor to become mixed into the water so that upon its release through the openings 15 of the inlet conduit 13 the vapor will be finely dispersed as small bubbles that upon release attach themselves to the oil and solids particles floating the particles to the surface of the water. The water upon exiting conduit 13 travels horizontally and downwardly toward the lower edge 10A of partition 10 thus passing over the area wherein recycled water is being emitted through the recycle water inlets 8 and 9. The recycled water is delivered through high velocity venturi inductors 21 and 22 that draw recycled vapor through the recycle vapor line 37. The velocity is sufficient to cause the vapor to become entrained in the recycled water so that on its entry into the vessel, the vapor will be emitted as finely dispersed bubbles. The diffuser disc 23 and 24 distribute the bubbles over a wide area of the vessel cross section. The volume of recycled water and thus the amount of recycled vapor bubbling can be controlled by raising or lowering the pressure setting of the recycle bypass control valve 35. The bubbles emitted with the recycled water will attached themselves to the remaining suspended oil and solids particles as the water passes through the second phase of water cleaning;

finally as the water passes into the water discharge chamber 40 an upward momentum is imparted through deflection caused by impingement on baffle 19. This compartment, defined by the partitions 10 and 11 and the interior wall of the vessel, affords one more opportunity for the residual vapor bubbles to carry the last particles of oil and solids to the water surface. The oil and solids are skimmed from the surface of the water by a continuous flow of water into the skimmings conduit 16 through the openings 17. The skimmings carried by the water are deposited into the skimmings dewatering compartment 18. In this compartment the water will settle to the bottom of the vessel raising in level until its upper surface contacts the skimmings/water interface sensor 28 at which time a signal will be sent to close the recycled water control valve 34 thereby causing the pump 26 to withdraw the water from the dewatering compartment. Check valve 36 prevents water from back flowing from the water discharge chamber. The upper surface of the dewatered skimmings will build from the water interface to the top edge 12A of the skimmings box at which time the dewatered skimmings will flow into the skimmings box building a level in the skimmings box up to the level sensor 29 which will then cause skimmings discharge valve 33 to open for delivery of the skimmings to disposal. The required operating pressure is maintained by adding gas through a vapor make up valve 30 if the pressure declines; and venting gas through vapor vent valve 31 if the pressure increases. The water level is maintained by level sensor 27 in cooperation with water discharge valve 32.

From the foregoing it can be seen that this invention is one well adapted to attain all the ends and objects herein set forth, together with other advantages which are obvious and inherent.

It is understood that certain features and subcombinations are of utility and may be employed without reference to other features and subcombinations. This is contemplated by and within the scope of the claims. Although the foregoing invention has been described in detail, by way of illustration and example, for purposes of clarity of understanding it will be obvious that certain changes and modifications may be practiced within the scope of the appended claims.

The various methods and apparatus used in carrying out this invention have been described previously in detail and need not be repeated.

I claim:

1. An improved method for removing finely dispersed oil and solids particles from water using induced gas flotation comprising:

providing a containment vessel having partitions dividing said vessel into multiple compartments for receiving and processing water containing finely dispersed oil and solids particles;

feeding said water with oil and solid particles therein to a first compartment of said vessel, said feed includes passing said water with oil and solid particles therein through a first venturi inductor means for inducing gas vapor into said water entering the containment vessel;

removing a portion of the processed water from a second compartment in the containment vessel for recycle with a pump;

pumping said portion of processed water from said second compartment through a second venturi inductor means for inducing gas vapor into said recycled portion of the water and feeding the gasified water from said second venturi means into said first compartment;

removing skimmings containing water, oil and solid particles collected at the upper surface of the water being processed, said skimmings removal occurring within said containment vessel;

delivering said skimmings into a third compartment within the containment vessel and separating the water from the oil and solids particles;

and circulating and commingling said separated water separated from the oil and solid particles in the third compartment with the said recycled water utilizing the same pump to circulate the commingled water back to said second venturi inductor means and into said first compartment.

2. An improved method for removing finely dispersed oil and solid particles from water using induced gas flotation comprising:

providing a substantially enclosed containment vessel having partitions dividing the vessel into multiple compartments for receiving and processing water containing finely dispersed oil and solids particles;

feeding said water with oil and solid particles therein to a first compartment of said vessel, said feeding includes passing said water with oil and solid particles therein through a first venturi inductor means for inducing gas vapor into said water entering the containment vessel;

removing a portion of the processed water from a second compartment in the containment vessel for recycle with a pump having a pump inlet and a pump outlet;

pumping said portion of processed water from said second compartment from said pump outlet and through a connecting means and then through a second venturi means for inducing gas vapor into said recycled portion of the water and feeding the gasified water from said second venturi means into said first compartment;

skimming off oil and solids particles with water collected at the upper surface of the water being processed, said skimming occurring within said containment vessel;

delivering said skimmed oil and solids particles with water into a third compartment and separating of the water from the oil and solids particles;

circulating gas vapor from an upper region of the substantially closed containment vessel through an external conduit to the first venturi inductor means;

regulating the flow rate of said gas vapor to said first venturi means;

a bypass conduit having two ends with one end connected before the pump inlet and the other end connected to the connecting means between said pump outlet and the second venturi inductor means, said bypass conduit having controlling means for regulation of the flow rate of the recycled water to the second venturi inductor means to thereby set the flow rate of the gas vapor induced by the second venturi inductor means.

3. The method of claim 2, wherein the water separated from the oil and solids particles in the third compartment is circulated and commingled with said portion of the processed water form the second compartment utilizing the same said pump to circulate and commingle water back to the second venturi inductor means and into said first compartment.

\* \* \* \* \*